Jan. 2, 1951     J. T. LITTLETON     2,536,192

METHOD OF PREPARING CELLULAR GLASS SLABS

Filed June 19, 1945     3 Sheets-Sheet 1

INVENTOR.
J. T. LITTLETON
BY
Olen E. Bee
ATTORNEY.

Jan. 2, 1951 J. T. LITTLETON 2,536,192
METHOD OF PREPARING CELLULAR GLASS SLABS
Filed June 19, 1945 3 Sheets-Sheet 2

INVENTOR.
J. T. LITTLETON
BY
Olen E. Bee
ATTORNEY.

Jan. 2, 1951  J. T. LITTLETON  2,536,192
METHOD OF PREPARING CELLULAR GLASS SLABS
Filed June 19, 1945  3 Sheets-Sheet 3
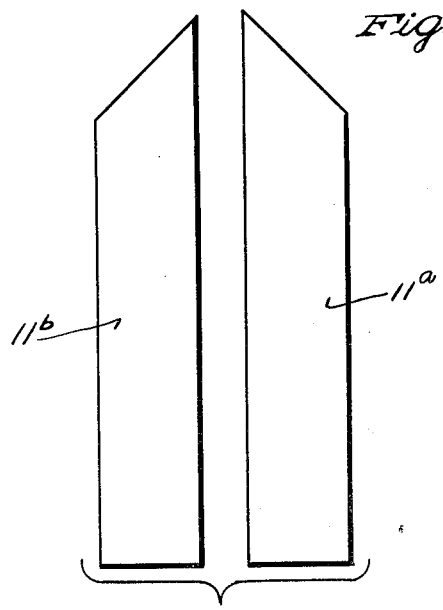
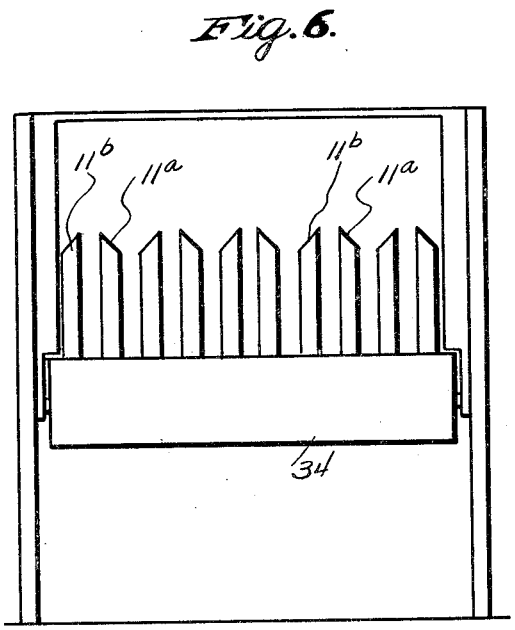
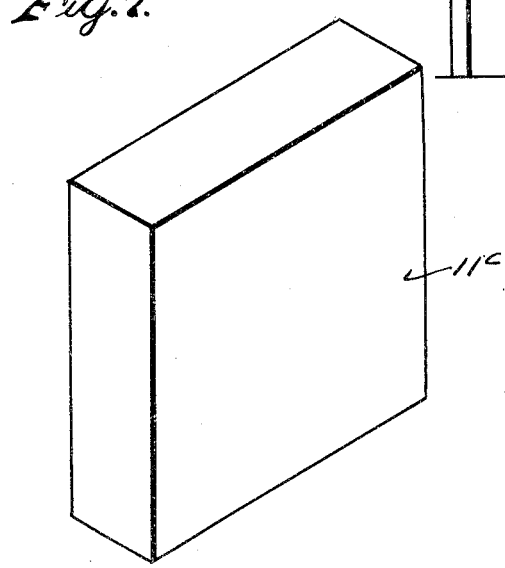
INVENTOR.
J. T. LITTLETON
BY Olen E. Bee
ATTORNEY Patented Jan. 2, 1951

2,536,192

UNITED STATES PATENT OFFICE 2,536,192

METHOD OF PREPARING CELLULAR GLASS SLABS

Jesse T. Littleton, Corning, N. Y., assignor to Corning Glass Works, Corning, N. Y., a corporation of New York Application June 19, 1945, Serial No. 600,246

9 Claims. (Cl. 49—79)

The present invention relates to the preparation of cellulated glass bodies and it has particular relation to the preparation of such bodies by a process involving the heating of an intimate mixture of finely pulverized glass and a gas producing agent such as carbon black, calcium carbonate, or the like to a temperature sufficient to sinter and cohere the particles of glass and simultaneously to liberate bubbles of gas in relatively uniform distribution in the sintered mass.

One object of the invention is to provide a process of forming and annealing cellular glass by the foregoing method in which the annealing operation is substantially accelerated.

A second object of the invention is to provide a process of forming cellular glass in which dishing and distortion of the slabs or bodies as a result of cooling effects upon the freshly formed body are reduced to a minimum.

It has, heretofor, been proposed to prepare thermal insulating material of high efficiency, durability, and low weight by finely pulverizing glass, admixing the powdered material with a small amount, e.g. .2 to 2% of a powdered gassing agent such as carbon black or lamp black or calcium carbonate and then heating the mixture in appropriately shaped molds to a temperature sufficient to sinter and frit together without actually fusing down the particles of glass, and to decompose the gassing agent to generate bubbles in the sintered mass.

The common commercial method of preparing such body is to introduce the powdered material into molds which preferably comprise upper and lower sections of a heat resistant alloy steel. These sections are of a configuration resembling a conventional kitchen roaster or a pair of bread pans, the edges of the lower sections being designed to register with the inverted edges of the upper. The material is introduced into the molds in such amount that as a result of the bloating operation, the molds will be practically completely filled without any substantial tendency for the contents to overflow. The molds are heated to desired temperature by passing them through a roller hearth furnace, which is a long tunnel-like furnace having a series of driven rollers disposed in such position as to form a conveyor for the molds from one end to the other. Heat is supplied to the furnace by burners or other suitable heating apparatus to sinter and cohere the particles of glass and to decompose the gassing agent. When the sintering and bloating operation is completed, the molds are cooled slightly (for example, to 800° or 900° F.) in order to harden the outside shell of the sintered mass, after which the mold sections are removed and then the bodies in the form of cakes or slabs are annealed in a tunnel-like leer preferably equipped with a belt conveyor formed of refractory material such as link mesh of alloy steel.

It will be apparent that the highly cellulated bodies at the time of introduction into the leer for annealing are very poor conductors of heat so that the interiors remain comparatively hot and plastic even after the outer surfaces have cooled substantially to form a hardened shell. In order to obtain uniformity of temperature throughout the heated masses, the reduction of temperature to obtain the desired cooling and annealing must be conducted very slowly, for example, over a period of time many fold that required in the annealing of conventional glass articles. For these reasons, it is usually necessary to operate the roller hearth furnace far below its capacity in order to obtain adequate annealing of the wares in the leer. Furthermore, in the conventional operation, when the fairly solid shell is formed about the cellular cakes or bodies, the interiors still retain a relatively high degree of softness and plasticity, and the hot gases in the plastic interiors are highly expanded. As cooling progresses, these gases tend to shrink while the walls of the retaining cells are still soft and plastic, so that the cakes tend to shrink or contract, especially in the center portion, much as bread or cake would do in conventional baking operations. Serious dishing and distortion is thus induced and in order to obtain commercially useful articles or slabs, it is generally necessary to trim off the distorted outer portions of each cake. This is done by means of thin revolving abrasive discs or grinders which readily cut through the cellulated masses. A considerable percentage of the cake or slab is thus cut away and lost.

In accordance with the provisions of the present invention, it is proposed to reduce the difficulties above described by preparing slabs or blocks of cellular glass in molds which are of a depth about twice that of the conventional mold and which is therefore designed to provide cakes or slabs which are of a thickness corresponding to that of two of the slabs as used. These thick cakes are then removed from the molds and subjected to a splitting operation by means of suitable abrasive or serrated bands while they are still soft and plastic in the interior. As a result of the splitting operation, blocks or slabs of conventional thickness are formed and the hot interior portions of the blocks are thus exposed so that they will cool more rapidly than they otherwise would. The interior portions are also by reason of rapid cooling, converted into solidified form which does not undergo distortion and sinking to such extent as occurs in conventional practice.

Apparatus for use in the practice of the invention is illustrated in the drawings in which like numerals refer to like parts and in which:

Fig. 4 is a bracketed elevational view of the two slabs as they are obtained by splitting a thick slab;

Fig. 6 is an end elevational view of an annealing lehr in which to anneal the slabs of cellulated material;

Fig. 7 is a perspective view of a finished slab as prepared by the method herein described.

Figure 1:
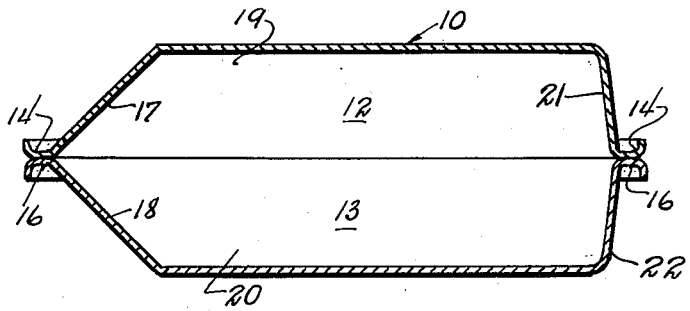
Fig. 1 is a sectional view taken upon the line I—I of Fig. 2 of a mold in which to form the cakes of cellulated or low density glass.
Figure 2:
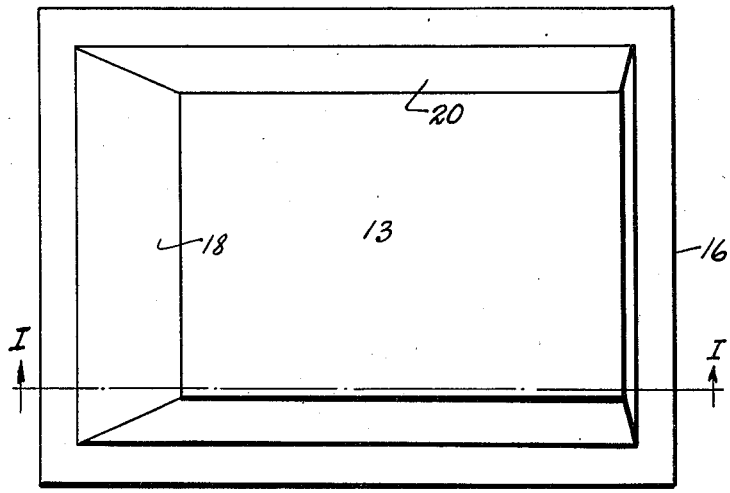
Fig. 2 is a plan view of a mold section, e. g. a bottom section.

In the practice of the invention, molds such as the mold 10 illustrated in Fig. 1 may be employed for the formation of cakes 11 which preferably are of a thickness approximately corresponding to that of two slabs of conventional thickness before they are cut and trimmed to final form. A mold constructed as shown in Fig. 1 comprises upper and lower sections 12 and 13 having lips 14 and 16. These sections approximately correspond to a conventional kitchen roaster or bread pan. These two sections are shown as being substantially identical in size and shape so that the lip portions 14 and 16 will register with each other, thus providing a closed mold chamber. It is to be noted that the front walls 17 and 18 of the two sections are substantially outwardly flared. The same is also true of the side walls 19 and 20 of the mold section. This admits of easy removal of the cakes after they have been formed in the mold sections. It is desirable that the rear walls 21 and 22 be less substantially flared in order to provide relatively flattened base portions so that the cakes after removal of the mold sections can be easily set on edge for annealing operations.

Figure 5:
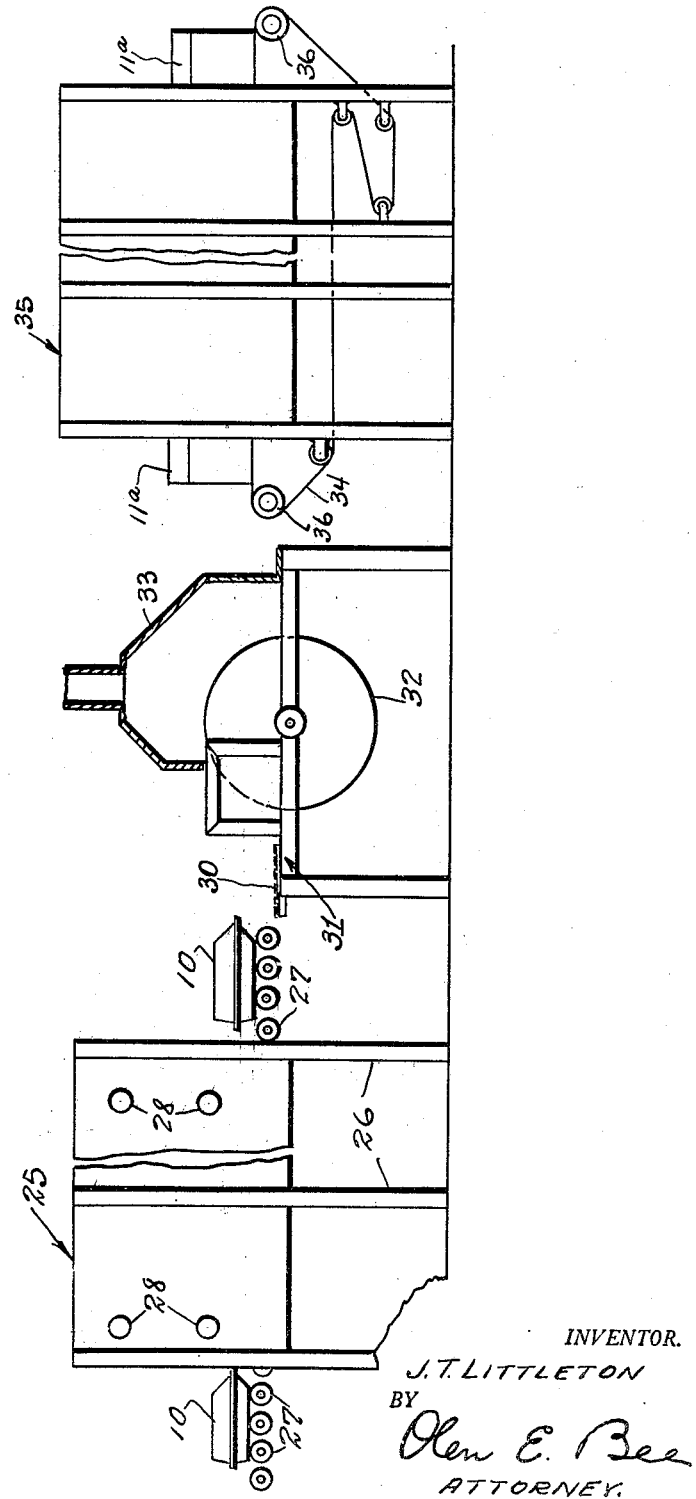
Fig. 5 is a diagrammatic view partly in elevation and partly in section of a suitable embodiment of apparatus for use in practicing the invention.

Apparatus suitable for heating the molds in order to sinter powdered glass mixed with gassing agents and for subsequently treating the cakes as obtained from the heating operation is illustrated in Fig. 5 and includes a tunnel-like roller hearth furnace 25 of refractory material. This furnace may be supported at any convenient elevation above the floor by means of upright members 26. A conveyor system for conducting the molds and their contents through the furnace comprises a system of driven rollers 27 arranged as a train throughout the length of the furnace and being designed to carry the molds slowly and at a uniform rate through the furnace. The furnace, of course, is heated by suitable burners or other devices 28 which by reason of their conventionality is not believed necessary to illustrate in detail. As shown in the drawing, the system of rollers extends outwardly beyond the opposite ends of the furnace to provide a suitable platform for loading and unloading the molds.

The molds at the discharged end of the furnace are stripped away from the cakes 11 merely by prying the two mold sections apart lifting off the upper section and knocking the cake out of the lower section. The cakes, although still very hot and plastic in their interiors as received from the furnace, are substantially hardened upon their exteriors and since the cellulated material is a very poor conductor of heat, it is possible for the workmen to pick up the cakes with insulative gloves or by other suitable means.

Figure 3:
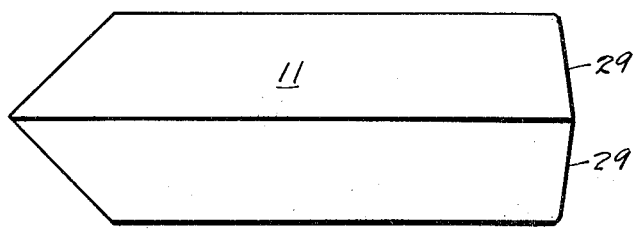
Fig. 3 is an elevational view of a cake formed in the mold before it is split to form two slabs for annealing in accordance with the provisions of the present invention.

The cakes, as illustrated in Fig. 3, have base portions 29 which are very slightly wedged shape. In order further to flatten this base portion, it is desirable to scuff it over an abrasive member, such as a section of wire mesh 30 upon a cutter platform 31. The material by reason of its cellular nature is comparatively frangible and a sufficient amount of material adequate to flatten the base can easily be scuffed off by a few strokes over this member. The cakes, while still hot in the interior, are caused to contact with the edge of a cutting member, such as a motor driven abrasive disc or saw 32 rotatably mounted in the platform 31 under suction hood 33. Each cake is split along its medial plane into sections 11a and 11b as shown in Fig. 4. These sections have flattened base portions upon which the slabs can easily be stood for annealing. If preferred, the slabs can be completely trimmed upon all edges and faces, thus obviating the necessity of flattening the base upon member 30 and also conserving further upon annealing time by removing some of the material to be annealed. A slab so finished is illustrated at 11c in Fig. 7.

For purposes of annealing, the slabs are placed upon an endless conveyor belt 34 preferably formed of a mesh of refractory material, such as stainless steel wire. This conveyor is supported in lehr 35 upon a system of rollers 36, one or more of which is appropriately driven by motor means (not illustrated). As shown in Fig. 6 of the drawing, the sections 11a and 11b are set upon their base portions in spaced relation in order to permit the adequate circulation of the gases between the various slabs. The slabs upon the conveyor 34 are conducted very slowly through the annealing lehr over a period probably five times that involved in the annealing of conventional wares. This extremely long annealing time is necessary because of the low heat conductivity of the cellulated slabs. Unless the temperature is brought down extremely slowly great differentials of temperature between the interior portions of the outer shells of the hot slabs are likely to be created and these differentials set up thermal stresses which result in cracking and breaking of the slabs. The slabs after they have passed through the annealing lehr can be trimmed of the edge portions and the dished or otherwise deformed surfaces in order to provide slabs which are perfectly rectangular in their various transverse sections and which, therefore, are readily adapted for laying to form insulative walls.

In the operation of the apparatus as above described, it is, of course, necessary to place in each mold only such amount of the mixture of crushed glass and gassing agent as is required just substantially to fill the molds. This will vary to some extent with the density desired in the finished material. However, usually it can be expected that the material will expand six or seven fold as a result of the heating and bloating operation in the roller hearth furnace. Therefore, the molds should be filled approximately to 1/5 to 1/8 their capacity. The crushed glass preferably comprises glass very finely divided, e. g. of a particles size such that most of it will pass through a screen of two or three hundred mesh or even finer, where that is commercially favorable. The gassing agent may comprise carbon black, lamp black, channel black, finely pulverized coal, and the like carbonaceous materials. Finely powdered limestone may also be employed as a gassing agent since it decomposes at a temperature, near the sintering temperature of the glass, to generate large volumes of gas which cause the sintered mass to bloat or cellulate. Where very finely divided black, such as channel black, is employed as the gassing agent, approximately 0.2% of the black based upon the glass content may be employed and this percentage increases substantially for some forms of the carbonaceous material. Where calcium carbonate is employed as a gassing agent, the amount may be as much as 1½ or 2% based upon the glass content.

The heating operation is conducted fairly carefully and in more or less well defined stages. First, the material is heated to a temperature to which the particles of glass will sinter together without undue decomposition of the gassing agent employed. This temperature, of course, will vary to some extent dependent upon the melting point of the glass. Usually it will be in the neighborhood of 1200° or 1400° F. After the material has become sufficiently heated and sintered, the molds are passed into a section of the furnace where it is heated approximately 100° or 200° hotter, e. g. to 1500° or 1600° F. In order to decompose the gassing agent and thus to liberate the bloating gases and simultaneously, somewhat, to soften the sintered mass, thus permitting freer expansion of the bubbles of gas entrapped therein. After the material has become sufficiently bloated, it is desirable to pass the molds through a section of the furnace at a temperature permitting the exterior portions of the cakes in the molds to drop in temperature to approximately 800° or 900° F. in order to superficially harden the cakes or form a shell thereabout which will admit of subsequent removal of the molds and the more ready handling of the cakes. After the cakes have thus superficially hardened in the molds, the molds may be subjected to shock heating to approximately 1200° F., that is, to a very brief heating operation in order differentially to expand the molds without substantially heating the less conductive cakes contained therein. This shock heating operation occurs just before removal of the molds from the roller hearth furnace. Immediately upon emergence of the molds from the furnace, the mold sections are pried apart, for example, by the insertion of a suitable wedging instrumentality between the lips of the two mold sections. The top section can be lifted off and the cake can be knocked out of the bottom section. The molds may then be returned for refilling and recycling while the cakes are further processed, first by scuffing the flattened base portions upon the abrasive member 30 as previously described, by splitting the cakes upon the cutting disc 32, after which the rough slabs as thus obtained are set on edge in spaced relation as shown in Fig. 5 for the annealing operation.

The forms of the invention herein shown and described are to be considered merely as exemplary of the invention. It will be apparent to those skilled in the art that numerous modifications may be made therein without departing from the spirit of the invention or the scope of the appended claims.

I claim:

1. In the process of forming glass slabs of predetermined thickness of low apparent density and high thermal insulating value and comprising a bloated cellulated mass of cohered glass particles, the steps comprising heating a mixture of finely pulverized glass and a pulverized gassing agent in a mold of a depth corresponding approximately to that of two rough slabs suitable for trimming to single slab thickness, to the temperature of sintering of, but below the temperature of complete fusion of the glass particles in order to cohere said particles and to decompose the gassing agent to bloat the sintered mass into a cellulated cake, superficially chilling the cake to form a hard outer shell while the interior is still hot and plastic, removing the mold, splitting the cake medianly into two single thickness slabs while the interior is still heated above the annealing temperature, then annealing the two slabs so obtained and subsequently trimming the slabs to said predetermined thickness.

2. In the process of forming glass slabs of predetermined thickness of low apparent density and high thermal insulating value and comprising a bloated cellulated mass of cohered glass particles, the steps comprising heating a mixture of finely pulverized glass and a pulverized gassing agent in a mold of a depth corresponding approximately to that of two rough slabs suitable for trimming to single slab thickness, to the temperature of sintering of, but below the temperature of complete fusion of the glass particles in order to cohere said particles and to decompose the gassing agent to bloat the sintered mass into a cellulated cake, superficially chilling the cake to form a hard outer shell while the interior is still hot and plastic, removing the mold, splitting the cake medianly into two single thickness slabs while the interior is still heated above the annealing temperature, standing the two slabs so obtained on edge in spaced relation and subjecting them to annealing and then trimming the two slabs to said predetermined thickness.

3. In the process of forming glass slabs of predetermined thickness of low apparent density and high thermal insulating value and comprising a bloated cellulated mass of cohered glass particles, the steps comprising heating a mixture of finely pulverized glass and a pulverized gassing agent in a mold of a depth corresponding approximately to that of two rough slabs suitable for trimming to single slab thickness to the temperature of sintering of, but below the temperature of complete fusion of the glass particles in order to cohere said particles and to decompose the gassing agent to bloat the sintered mass into a cellulated cake of double thickness, superficially chilling the cake to form a hard outer shell while the interior is still hot and plastic, removing the mold, splitting the cake medianly into two single thickness slabs while the interior is still heated above the annealing temperature, then annealing the two slabs so obtained.

4. In the process of forming glass slabs of predetermined thickness and of low apparent density and high thermal insulating value and comprising a bloated cellulated mass of cohered glass particles, the steps comprising heating a mixture of finely pulverized glass and a pulverized gassing agent in a mold of a depth corresponding approximately to that of two rough slabs suitable for trimming to single slab thickness, to the temperature of sintering of, but below the temperature of complete fusion of the glass particles in order to cohere said particles and to decompose the gassing agent to bloat the sintered mass into a double thickness cellulated cake, superficially chilling the cake to form a hard outer shell while the interior is still hot and plastic, removing the mold, trimming away exterior portions of and splitting the cake while the interior is still heated above the annealing temperature, then annealing the two slabs so obtained.

5. In the process of forming annealed cellular glass slabs, the steps of forming a thick, bloated cake of glass having a hard outer shell and a hot plastic interior, splitting said cake into slabs prior to annealing, and annealing the slabs as separate units.

6. In the process of forming annealed slabs of cellular glass from a thick cake of cellular glass obtained by sintering a mixture of pulverized glass and a gassing agent, to provide said cake as a cellulated coherent mass, the steps of partially cooling the cake to provide a relatively rigid exterior crust while the interior is still hot, then splitting the cake into slabs and annealing the slabs as individual units.

7. A process of forming cellular glass slabs comprising the steps of, cellulating the glass while confined in a mold to form a slab of at least twice the finished thickness, chilling the mold to stop cellulation in the slab adjacent the mold surfaces to form rigid crusts on the exterior surfaces of the contained slab, removing the slab from the mold, splitting the slab lengthwise to form sections one-half the original slab thickness and to expose the interior of the slab for rapid cooling to form rigid crusts on the newly exposed surfaces, and annealing the slab sections.

8. A process of forming cellular glass slabs comprising the steps of, cellulating the glass while confined within a mold, chilling the mold to stop cellulation at the exterior surfaces of the slab and form rigid crusts on said surfaces, removing the slab from the mold, splitting the slab lengthwise for chilling and forming rigid crusts on the newly exposed interior surfaces, and annealing the slab sections.

9. A process of forming cellular glass slabs comprising the steps of, cellulating the glass to slab form while confined in a mold, cooling the mold to form crusts on the exterior surfaces of the slab while the interior of the slab remains at or near cellulating temperature, removing the slab from the mold, splitting the slab to expose the soft interior thereof for rapid cooling of the newly exposed surfaces to form rigid crusts thereon, and annealing the slab sections to end cellulation therein and relieve internal stresses resulting from rigidifying of the sections.

JESSE T. LITTLETON.

REFERENCES CITED

The following references are of record in the file of this patent:

UNITED STATES PATENTS

| Number | Name | Date |
| --- | --- | --- |
| 2,118,707 | Ingouf | May 24, 1938 |
| 2,257,681 | Haux | Sept. 30, 1941 |
| 2,261,022 | Fox et al. | Oct. 28, 1941 |
| 2,306,230 | Dewey | Dec. 22, 1942 |
| 2,401,582 | Owen | June 4, 1946 |